United States Patent
Wilkins et al.

(10) Patent No.: US 7,582,198 B2
(45) Date of Patent: *Sep. 1, 2009

(54) WATER TREATMENT SYSTEM AND METHOD

(75) Inventors: Frederick Wilkins, Pepperell, MA (US); Evgeniya Freydina, Acton, MA (US); Aytac Sezgi, Bedford, NH (US); Reshma Madhusudan, Arlington Heights, IL (US); Anil D. Jha, Lincoln, MA (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 834 days.

This patent is subject to a terminal disclaimer.

(21) Appl. No.: 10/712,674

(22) Filed: Nov. 13, 2003

(65) Prior Publication Data

US 2005/0103724 A1 May 19, 2005

(51) Int. Cl.
*B01D 61/44* (2006.01)
*B01D 61/48* (2006.01)

(52) U.S. Cl. .............. 204/522; 204/524; 204/525; 204/533; 204/631; 204/632

(58) Field of Classification Search ......... 204/627–634, 204/522–541
See application file for complete search history.

(56) References Cited

U.S. PATENT DOCUMENTS

| | | | |
|---|---|---|---|
| 2,514,415 A | 7/1950 | Rasch | |
| 2,535,035 A * | 12/1950 | Briggs | ............ 205/746 |
| 2,681,319 A | 6/1954 | Bodamer | |
| 2,681,320 A | 6/1954 | Bodamer | |
| 2,788,319 A | 4/1957 | Pearson | |
| 2,794,777 A | 6/1957 | Pearson | |
| 2,815,320 A | 12/1957 | Kollsman | |
| 2,854,394 A | 9/1958 | Kollsman | |
| 2,923,674 A | 2/1960 | Kressman | |
| 2,943,989 A | 7/1960 | Kollsman | |
| 3,014,855 A | 12/1961 | Kressman | |
| 3,074,864 A | 1/1963 | Gaysowski | |
| 3,099,615 A | 7/1963 | Kollsman | |
| 3,148,687 A | 9/1964 | Dosch | |
| 3,149,061 A | 9/1964 | Parsi | |
| 3,149,062 A | 9/1964 | Gottschal et al. | |
| 3,165,460 A | 1/1965 | Zang et al. | |
| 3,291,713 A | 12/1966 | Parsi | |

(Continued)

FOREIGN PATENT DOCUMENTS

AU   B-18629/92   10/1992

(Continued)

OTHER PUBLICATIONS

Yoran Oren et al., "Studies on Polarity Reversal with Continuous Deionization," *Desalination*, Elsevier Scientific Publishing Co., Amsterdam, NL, vol. 86, No. 2, Jun. 1, 1992, pp. 155-171.

(Continued)

*Primary Examiner*—Arun S Phasge (57) ABSTRACT

A method and apparatus for producing purified water. An electrochemical system can be configured to pass product water through depletion compartments as well as a cathode compartment. An electrochemical apparatus may also be configured to pass concentrate through both concentrating compartments and an anode compartment.

30 Claims, 6 Drawing Sheets

U.S. PATENT DOCUMENTS

| | | |
|---|---|---|
| 3,330,750 A | 7/1967 | McRae et al. |
| 3,341,441 A | 9/1967 | Giuffrida et al. |
| 3,375,208 A | 3/1968 | Duddy |
| 3,627,703 A | 12/1971 | Kojima et al. |
| 3,630,378 A | 12/1971 | Bauman |
| 3,645,884 A | 2/1972 | Gilliland |
| 3,686,089 A | 8/1972 | Korngold |
| 3,755,135 A | 8/1973 | Johnson |
| 3,869,375 A | 3/1975 | Ono et al. |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,102,752 A | 7/1978 | Rugh, II |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,167,551 A | 9/1979 | Tamura et al. |
| 4,191,811 A | 3/1980 | Hodgdon |
| 4,197,206 A | 4/1980 | Karn |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,358,545 A | 11/1982 | Ezzell et al. |
| 4,374,232 A | 2/1983 | Davis |
| 4,430,226 A | 2/1984 | Hegde et al. |
| 4,465,573 A | 8/1984 | O'Hare |
| 4,473,450 A | 9/1984 | Nayak et al. |
| 4,505,797 A | 3/1985 | Hodgdon et al. |
| 4,574,049 A | 3/1986 | Pittner |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno et al. |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,793 A | 9/1988 | Treffry-Goatley et al. |
| 4,804,451 A | 2/1989 | Palmer |
| 4,808,287 A | 2/1989 | Hark |
| 4,830,721 A * | 5/1989 | Bianchi et al. ............... 210/748 |
| 4,849,102 A | 7/1989 | Latour et al. |
| 4,871,431 A | 10/1989 | Parsi |
| 4,872,958 A | 10/1989 | Suzuki et al. |
| 4,915,803 A | 4/1990 | Morris |
| 4,925,541 A | 5/1990 | Giuffrida et al. |
| 4,931,160 A | 6/1990 | Giuffrida |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 5,026,465 A | 6/1991 | Katz et al. |
| 5,030,672 A | 7/1991 | Hann et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,106,465 A | 4/1992 | Kaczur et al. |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| H1206 H | 7/1993 | Thibodeaux et al. |
| 5,240,579 A | 8/1993 | Kedem |
| 5,254,227 A | 10/1993 | Cawlfield et al. |
| 5,259,936 A | 11/1993 | Ganzi |
| 5,286,354 A | 2/1994 | Bard et al. |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,346,624 A | 9/1994 | Libutti et al. |
| 5,346,924 A | 9/1994 | Giuffrida |
| 5,356,849 A | 10/1994 | Matviya et al. |
| 5,358,640 A | 10/1994 | Zeiher et al. |
| 5,376,253 A | 12/1994 | Rychen et al. |
| 5,411,641 A | 5/1995 | Trainham, III et al. |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Elyanow et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,670,053 A | 9/1997 | Collentro et al. |
| 5,679,228 A | 10/1997 | Elyanow et al. |
| 5,679,229 A | 10/1997 | Goldstein et al. |
| 5,714,521 A | 2/1998 | Kedem et al. |
| RE35,741 E | 3/1998 | Oren et al. |
| 5,736,023 A | 4/1998 | Gallagher et al. |
| 5,759,373 A | 6/1998 | Terada et al. |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,814,197 A | 9/1998 | Batchelder et al. |
| 5,837,124 A | 11/1998 | Su et al. |
| 5,858,191 A | 1/1999 | DiMascio et al. |
| 5,868,915 A | 2/1999 | Ganzi et al. |
| 5,891,328 A | 4/1999 | Goldstein |
| 5,925,240 A | 7/1999 | Wilkins et al. |
| 5,928,807 A | 7/1999 | Elias |
| 5,954,935 A | 9/1999 | Neumeister et al. |
| 5,961,805 A | 10/1999 | Terada et al. |
| 5,980,716 A | 11/1999 | Horinouchi et al. |

| | | | | | | | |
|---|---|---|---|---|---|---|---|
| 6,056,878 | A | 5/2000 | Tessier et al. | EP | 1 101 790 A1 | 5/2001 | |
| 6,099,716 | A | 8/2000 | Molter et al. | EP | 1 106 241 A1 | 6/2001 | |
| 6,103,125 | A | 8/2000 | Kuepper | EP | 1172145 A2 | 1/2002 | |
| 6,126,805 | A | 10/2000 | Batchelder et al. | EP | 1222954 A1 | 7/2002 | |
| RE36,972 | E | 11/2000 | Baker et al. | EP | 1 222 954 A1 | 12/2002 | |
| 6,146,524 | A | 11/2000 | Story | EP | 1506941 A1 | 2/2005 | |
| 6,149,788 | A | 11/2000 | Tessier et al. | EP | 1762546 | 3/2007 | |
| 6,171,374 | B1 | 1/2001 | Barton et al. | GB | 776469 | 6/1957 | |
| 6,187,154 | B1 | 2/2001 | Yamaguchi et al. | GB | 877239 | 9/1961 | |
| 6,187,162 | B1 | 2/2001 | Mir | GB | 880344 | 10/1961 | |
| 6,190,528 | B1 | 2/2001 | Li et al. | GB | 893051 | 4/1962 | |
| 6,190,553 | B1 | 2/2001 | Lee | GB | 942762 | 11/1963 | |
| 6,190,558 | B1 | 2/2001 | Robbins | GB | 1048026 | 11/1966 | |
| 6,193,869 | B1 | 2/2001 | Towe et al. | GB | 1137679 | 12/1968 | |
| 6,197,174 | B1 | 3/2001 | Barber et al. | GB | 1 381 681 A | 1/1975 | |
| 6,197,189 | B1 | 3/2001 | Schwartz et al. | GB | 1448533 | 9/1976 | |
| 6,214,204 | B1 | 4/2001 | Gadkaree et al. | JP | 54-5888 | 1/1979 | |
| 6,228,240 | B1 | 5/2001 | Terada et al. | JP | 07-155750 | 6/1995 | |
| 6,235,166 | B1 | 5/2001 | Towe et al. | JP | 07-265865 | 10/1995 | |
| 6,248,226 | B1 | 6/2001 | Shinmei et al. | JP | 09-253643 | 9/1997 | |
| 6,254,741 | B1 | 7/2001 | Stuart et al. | JP | 11-42483 | 2/1999 | |
| 6,258,278 | B1 | 7/2001 | Tonelli et al. | JP | 2001-79358 | 3/2001 | |
| 6,267,891 | B1 | 7/2001 | Tonelli et al. | JP | 2001-79553 | 3/2001 | |
| 6,274,019 | B1 | 8/2001 | Kuwata | JP | 2001-104960 | 4/2001 | |
| 6,284,124 | B1 | 9/2001 | DiMascio et al. | JP | 2001-113137 | 4/2001 | |
| 6,284,399 | B1 | 9/2001 | Oko et al. | JP | 2001-113279 | 4/2001 | |
| 6,296,751 | B1 | 10/2001 | Mir | JP | 2001-113280 | 4/2001 | |
| 6,303,037 | B1 | 10/2001 | Tamura et al. | JP | 2001-121152 | 5/2001 | |
| 6,344,122 | B1 | 2/2002 | Deguchi et al. | JP | 2005007347 | 1/2005 | |
| 6,375,812 | B1 | 4/2002 | Leonida | JP | 2005007348 | 1/2005 | |
| 6,402,916 | B1 | 6/2002 | Sampson et al. | RO | 114 874 B | 8/1999 | |
| 6,402,917 | B1 | 6/2002 | Emery et al. | RU | 216622 | 11/1972 | |
| 6,482,304 | B1 | 11/2002 | Emery et al. | RU | 990256 | 1/1983 | |
| 6,607,647 | B2 | 8/2003 | Wilkins et al. | RU | 1118389 | 10/1984 | |
| 6,607,668 | B2 | 8/2003 | Rela | WO | WO 92/11089 | 7/1992 | |
| 6,627,073 | B2 | 9/2003 | Hirota et al. | WO | WO 95/32052 | 11/1995 | |
| 6,648,307 | B2 | 11/2003 | Nelson et al. | WO | WO 95/32791 | 12/1995 | |
| 6,649,037 | B2 | 11/2003 | Liang et al. | WO | WO 96/22162 | 7/1996 | |
| 6,766,812 | B1 | 7/2004 | Gadini | WO | WO 97/25147 | 7/1997 | |
| 6,783,666 | B2 | 8/2004 | Takeda et al. | WO | WO 97/46491 | 12/1997 | |
| 6,808,608 | B2 | 10/2004 | Srinivasan et al. | WO | WO 97/46492 | 12/1997 | |
| 6,824,662 | B2 | 11/2004 | Liang et al. | WO | WO 98/11987 | 3/1998 | |
| 2001/0003329 | A1 | 6/2001 | Sugaya et al. | WO | WO 98/17590 | 4/1998 | |
| 2002/0092769 | A1 | 7/2002 | Garcia et al. | WO | WO 98/20972 | 5/1998 | |
| 2002/189951 | A1 | 12/2002 | Liang et al. | WO | WO 98/58727 A1 | 12/1998 | |
| 2003/0080467 | A1 | 5/2003 | Andrews et al. | WO | WO 99/39810 | 8/1999 | |
| 2003/0089609 | A1 | 5/2003 | Liang et al. | WO | WO 00/30749 | 6/2000 | |
| 2003/0098266 | A1 | 5/2003 | Shiue et al. | WO | WO 00/64325 A2 | 11/2000 | |
| 2003/0155243 | A1 | 8/2003 | Sferrazza | WO | WO 00/75082 A1 | 12/2000 | |
| 2003/0201235 | A1 | 10/2003 | Chidambaran et al. | WO | WO 01/49397 A1 | 7/2001 | |
| 2004/0079700 | A1 | 4/2004 | Wood et al. | WO | WO 02/04357 A1 | 1/2002 | |
| 2005/0109703 | A1 | 5/2005 | Newenhizen | WO | WO 02/14224 A1 | 2/2002 | |
| 2006/0231403 | A1 | 10/2006 | Riviello | WO | WO 03/086590 A1 | 10/2003 | |

FOREIGN PATENT DOCUMENTS

| | | |
|---|---|---|
| CA | 2316012 A1 | 11/2001 |
| CN | 1044411 A | 8/1990 |
| DE | 1 201 055 | 9/1965 |
| DE | 3238280 A1 | 4/1984 |
| DE | 4016000 A1 | 11/1991 |
| DE | 44 18 812 A1 | 12/1995 |
| DE | 199 42 347 A1 | 3/2001 |
| EP | 0170895 A2 | 2/1986 |
| EP | 0 503 589 A1 | 9/1992 |
| EP | 0 621 072 A2 | 10/1994 |
| EP | 0 621 072 B1 | 10/1994 |
| EP | 0 680 932 A2 | 11/1995 |
| EP | 0803474 A2 | 10/1997 |
| EP | 0 870 533 A1 | 10/1998 |
| EP | 1 068 901 A2 | 1/2001 |
| EP | 1068901 A2 | 1/2001 |
| EP | 1075 868 A2 | 2/2001 |

OTHER PUBLICATIONS

Wood, J.H. et al., "Continuous Electrodeionisation: Module Design Considerations for the Production of High Purity Water," *Proc. Of IEX at the Millenium*, Jul. 16, 2000, pp. 44-51.

G.J. Gittens et al., "The Application of Electrodialysis to Demineralisation," A.I.Ch.E.-I.Chem.E. Symposium Series No. 9, 1965 (London: Instn chem. Engrs), pp. 79-83.

Glueckauf, "Electro-Deionisation Through a Packed Bed," *British Chemical Engineering*, Dec. 1959, pp. 646-651.

Hobro et al., "Recycling of Chromium from Metal Finishing Waste Waters Using Electrochemical Ion Exchange (EIX)," 1994, pp. 173-183, publication and date unknown.

Jha, Anil D. et al., "CEDI: Selecting the Appropriate Configuration," reprinted from *Power Engineering*, Aug. 2000 edition.

Johnson et al., "Desalting by Means of Porous Carbon Electrodes," *Electrochemical Technology*, vol. 118, No. 3, Mar. 1971, pp. 510-517.

Kedem et al., "EDS—Sealed Cell Electrodialysis," *Desalination*, vol. 46, 1983, pp. 291-299.

Kedem et al., "Reduction of Polarization by Ion-Conduction Spacers: Theoretical Evaluation of a Model System," *Desalination*, vol. 27, 1978, pp. 143-156.

Korngold, "Electrodialysis Process Using Ion Exchange Resins Between Membranes," *Desalination*, vol. 16, 1975, pp. 225-233.

Laktionov, Evgueni Viktorovitch, "Déminéralisation De Solutions Électrolytiques Diluées. Analyse Comparative Des Performances De Differents Procédés D'Électrodialyse", Directeur de these, Université Montpellier II, Science Et Technique Du Languedoc, 17 Juillet 1998.

Matejka, "Continuous Production of High-Purity Water by Electro-Deionisation," *J. Appl. Chem., Biotechnol.*, vol. 21, Apr. 1971, pp. 117-120.

Pourcelly, Gerald, Conductivity and selectivity of ion exchange membranes: structure-correlations, *Desalination*, vol. 147 (2002) pp. 359-361.

Purolite Technical Bulletin, Hypersol-Macronet™ Sorbent Resins, 1995.

V. Shaposhnik et al., "Demineralization of water by electrodialysis with ion-exchange membranes, grains and nets," *Desalination*, vol. 133, (2001), pp. 211-214.

R. Simons, "Strong Electric Field Effects on Proton Transfer Between Membrane-Bound Amines and Water," *Nature*, vol. 280, Aug. 30, 1979, pp. 824-826.

R. Simons, "Electric Field Effects on Proton Transfer Between Ionizable Groups and Water in Ion Exchange Membranes," *Electrochimica Acta*, vol. 29, No. 2, 1984, pp. 151-158.

R. Simons, "Water Splitting In Ion Exchange Membranes," Pergamon Press Ltd., 1985, pp. 275-282.

R. Simons, "The Origin and Elimination of Water Splitting in Ion Exchange Membranes During Water Demineralisation By Electrodialysis," *Desalination*, vol. 28, Jan. 29, 1979, pp. 41-42.

USFilter, "H-Series Industrial CDI® Systems," product information, 1998, 4 pgs.

Walters et al., "Concentration of Radioactive Aqueous Wastes," *Industrial and Engineering Chemistry*, Jan. 1955, pp. 61-67.

Warshawsky et al., "Thermally Regenerable Polymerable Polymeric Crown Ethers, II Synthesis and Application in Electrodialysis," pp. 579-584, publication and date unknown.

ASTM, "Standard Practice for Calculation and Adjustment of the Langelier Saturation Index for Reverse Osmosis," Designation: D3739-94 (Reapproved 1998), pp. 1-4.

Calay, J.-C. et al., "The Use of EDI to Reduce the Ammonia Concentration in Steam Generators Blowdown of PWR Nuclear Power Plants," *PowerPlant Chemistry*, vol. 2, No. 8, 2000, pp. 467-470.

Dimascio et al., "Continuous Electrodeionization: Production of High-Purity Water without Regeneration Chemicals," The Electrochemical Society *Interface*, Fall 1998, pp. 26-29.

Dimascio et al., "Electrodiaresis Polishing (An Electrochemical Deionization Process)," date unknown, pp. 164-172.

Dow Chemical, "Dowex Marathon A Ion Exchange Resin," published Dec. 1999, Product Literature reprinted from www.dow.com.

Dow Chemical, "Dowex Marathon A2 Ion Exchange Resin," published Nov. 1998, Product Literature reprinted from www.dow.com.

Dupont Nafion PFSA Products, Technical Information, "Safe Handling and Use of Perfluorosulfonic Acid Products," Feb. 2004. 4 pages.

Farmer et al., Capacitive Deionization of $NH_4ClO_4$ Solutions with Carbon Aerogel Electrodes, *J. Appl. Electro-Chemistry*, vol. 26, (1996), pp. 1007-1018.

FDA, "Guide to Inspections of High Purity Water Systems," printed from www.fda.gov. on Mar. 30, 2004, date unknown.

Ganzi, G.C. et al., "Electrodeionization: Theory and Practice of Continuous Electrodeionization," *Ultrapure Water*, Jul./Aug. 1997, pp. 64-69.

* cited by examiner

FIG. 6

WATER TREATMENT SYSTEM AND METHOD

BACKGROUND OF THE INVENTION

1. Field of the Invention

The invention is directed to a method and apparatus for purifying or treating water and, more specifically, for reducing or removing total dissolved solids in water.

2. Description of Related Art

Water that contains hardness species such as calcium and magnesium may be undesirable for some uses in industrial, commercial, and household applications. The typical guidelines for a classification of water hardness are: zero to 60 milligrams per liter (mg/l) as calcium carbonate is classified as soft; 61 to 120 mg/l as moderately hard; 121 to 180 mg/l as hard; and more than 180 mg/l as very hard.

Hard water can be softened or purified by removing or reducing the hardness ion species. Examples of systems that remove such species include those that use ion exchange beds. In such systems, the hardness ions become ionically bound to oppositely charged ionic species that are mixed on the surface of the ion exchange resin. The ion exchange resin eventually becomes saturated with ionically bound hardness ion species and must be regenerated. Regeneration typically involves replacing the bound hardness species with more soluble ionic species, such as sodium chloride. The hardness species bound on the ion exchange resin are replaced by the sodium ions and the ion exchange resins are ready again for a subsequent water softening step.

Such systems have been disclosed. For example, Dosch, in U.S. Pat. No. 3,148,687 teaches a washing machine including a water softening arrangement using ion exchange resins. Similarly, Gadini et al., in International Application Publication No. WO00/64325, disclose a household appliance using water with an improved device for reducing the water hardness. Gadini et al. teach of a household appliance having a control system, a water supply system from an external source and a softening system with an electrochemical cell.

Electrodeionization (EDI) is one process that may be used to soften water. EDI is a process that removes ionizable species from liquids using electrically active media and an electrical potential to influence ion transport. The electrically active media may function to alternately collect and discharge ionizable species, or to facilitate the transport of ions continuously by ionic or electronic substitution mechanisms. EDI devices can include media having permanent or temporary charge and can be operated to cause electrochemical reactions designed to achieve or enhance performance. These devices also include electrically active membranes such as semi-permeable ion exchange or bipolar membranes.

Continuous electrodeionization (CEDI) is a process wherein the primary sizing parameter is the transport through the media, not the ionic capacity of the media. A typical CEDI device includes alternating electroactive semi-permeable anion and cation exchange membranes. The spaces between the membranes are configured to create liquid flow compartments with inlets and outlets. A transverse DC electrical field is imposed by an external power source using electrodes at the bounds of the membranes and compartments. Often, electrolyte compartments are provided so that reaction product from the electrodes can be separated from the other flow compartments. Upon imposition of the electric field, ions in the liquid are attracted to their respective counter-electrodes. The adjoining compartments, bounded by the electroactive anion permeable membrane facing the anode and the electroactive cation permeable membrane facing the cathode, typically become ionically depleted and the compartments, bounded by the electroactive cation permeable membrane facing the anode and the electroactive anion membrane facing the cathode, typically become ionically concentrated. The volume within the ion-depleting compartments and, in some embodiments, within the ion-concentrating compartments, also includes electrically active media. In CEDI devices, the media may include intimately mixed anion and cation exchange resins. The ion-exchange media typically enhances the transport of ions within the compartments and may participate as a substrate for controlled electrochemical reactions. Electrodeionization devices have been described by, for example, Giuffrida et al. in U.S. Pat. Nos. 4,632,745, 4,925,541, and 5,211,823, by Ganzi in U.S. Pat. Nos. 5,259,936 and 5,316,637, by Oren et al. in U.S. Pat. No. 5,154,809 and by Kedem in U.S. Pat. No. 5,240,579, which are incorporated herein by reference.

SUMMARY OF THE INVENTION

In one aspect, the invention provides a water purification apparatus comprising a cathode compartment, an anode compartment, at least one ion-depleting compartment, a portion of the at least one ion-depleting compartment being positioned between the cathode compartment and the anode compartment, wherein the cathode compartment is fluidly connected to the ion-depleting compartment.

In another aspect, the invention provides for a method of purifying a fluid comprising passing a portion of a first fluid through an ion-depleting compartment of an electrochemical device to produce a second fluid and passing at least a portion of the second fluid through a cathode compartment of the electrochemical device.

In another aspect, the invention provides for a method of purifying water comprising passing a first portion of a first water stream through a cathode compartment of a water purification apparatus to produce a second water stream and passing at least a portion of the second water stream through an ion-depleting compartment of the water purification apparatus.

In another aspect, the invention provides for a method comprising passing a first portion of a first fluid through an ion-concentrating compartment of an electrochemical device to produce a second fluid, passing a second portion of the first fluid through a depletion compartment of the electrochemical device to produce a third fluid, reducing the pH of the second fluid and reducing the corrosiveness of the third fluid.

In another aspect, the invention provides for a method comprising providing an electrodeionization system to a home, the electrodeionization system configurable to continuously provide softened water for household consumption.

BRIEF DESCRIPTION OF THE DRAWINGS

Preferred, non-limiting embodiments of the present invention will be described by way of example and with reference to the accompanying drawings, in which.

DETAILED DESCRIPTION OF THE INVENTION

United States Patent Applications titled WATER TREATMENT SYSTEM AND METHOD by Jha et al., which was filed on Nov. 13, 2003 and assigned application Ser. No. 10/712,621; WATER TREATMENT SYSTEM AND METHOD by Ganzi et al., which was filed on Nov. 13, 2003 and assigned application Ser. No. 10/712,250; WATER TREATMENT SYSTEM AND METHOD by Freydina et al., which was filed on Nov. 13, 2003, assigned application Ser. No. 10/712,248, and issued as U.S. Pat. No. 7,083,733 on Aug. 1, 2006; WATER TREATMENT SYSTEM AND METHOD by Wilkins et al., which was filed on Nov. 13, 2003 and assigned application Ser. No. 10/712,163; WATER TREATMENT SYSTEM AND METHOD by Freydina et al., which was filed on Nov. 13, 2003 and assigned application Ser. No. 10/712,685; WATER TREATMENT SYSTEM AND METHOD by Wilkins et al., which was filed on Nov. 13, 2003 and assigned application Ser. No. 10/712,162; and WATER TREATMENT SYSTEM AND METHOD by Jha et al., which was filed on Nov. 13, 2003 and assigned application Ser. No. 10/712,166 are hereby incorporated by reference herein.

The invention provides a method and apparatus for the purification or treatment of water that can be used at or near a point of use, for example, a residence, to produce quality water for consumption and domestic use. The invention may provide treated tap water, such as softened water, using a low-cost apparatus that may have the qualities, among others, of exhibiting a small footprint, low power consumption, low maintenance, no chemical addition and no net increase in dissolved solids.

Although the examples described herein use electrodeionization devices, other water purification or treatment apparatus and techniques, such as capacitive deionization and electrodialysis, may be just as applicable. That is, where reference is made to an electrodeionization device, the systems and techniques of the present invention may be used with other water purification apparatus, such as an electrodialysis apparatus and/or a deionization apparatus, provided that the use of such apparatus is not inconsistent with the principles of the present invention.

In one embodiment, the invention includes a continuous electrodeionization device to provide a purified or treated water for household use. The CEDI device may include an electrodeionization module having one or more ion-depleting compartments, one or more ion-concentrating compartments, a cathode compartment and an anode compartment. Raw water may be fed to the CEDI device and may be split into two or more distinct streams. The first stream may supply both the ion-depleting compartments and the cathode compartment while the second stream may supply the ion-concentrating compartments and the anode compartment. In another embodiment, a stream may feed the ion-depleting compartment and both electrode compartments either in series or parallel.

Efficient operation of electrodeionization devices may often be hindered by deposit and scale build-up in one or more of the compartments or in external portions of the apparatus such as pumps, orifices, and valves. The deposition of scale, which may be composed primarily of calcium salts, occurs when the Langelier Saturation Index (LSI) is above 0. Several factors typically contribute to LSI, including, but not limited to, pH, total dissolved solids (TDS), temperature, hardness, alkalinity and carbon dioxide concentration. LSI may not indicate how much scaling will occur, but can provide information on whether a water will deposit scale (LSI>0), dissolve calcium deposits (LSI<0) or be in equilibrium (LSI=0) with any calcium deposits. Generally, the LSI is equal to the pH change that would be required in order to bring a water to equilibrium conditions. For example, a water exhibiting an LSI of 1.0 could be brought to equilibrium by reducing the pH of the water by 1.0 pH unit. A formula and chart that may be suitable for calculating LSI of a water can be found in ASTM Method D-3739.

In CEDI devices, scaling is often a problem in the ion-concentrating compartments where the concentration of calcium and other dissolved species is increased. Some scaling can be avoided, or removed, by the use of reverse polarity systems and techniques that alternate the function of the anode with the cathode and also may alternate the function of ion-depleting and ion-concentrating compartments. In this way, high LSI water would not be exposed to the same compartment for an extensive length of time over which scale can build up. Such systems and techniques have been described by, for example, Giuffrida et al. in U.S. Pat. No. 4,956,071, which is incorporated by reference herein in its entity.

In addition to the ion-concentrating compartments, scaling may also develop in the cathode compartment, due to several factors, one of which may be an increase in pH due to a net production of hydroxide ions. In this manner, a feedwater that has a low LSI, even a negative LSI, may start to deposit scale due to an increase in pH. Such a pH increase may encompass up to 1, 2, 3 or more pH units in some CEDI systems.

For a given cathode compartment, the increase in pH in the electrolyte passing through the cathode compartment is a function of many factors, including, but not limited to, the flow of electrolyte through the cathode compartment as well as the current passing through the compartment. Therefore, any pH increase may be minimized by, for example, increasing the rate of fluid flow or decreasing the rate of current flow through the cathode compartment. Increased fluid flow typically results in increased water use, however, and therefore decreases the yield of the treated water that is obtained from the system.

In accordance with one or more embodiments of the present invention, a method is provided that reduces any pH increase while also reducing water usage. Water can be passed through the cathode compartment, as well as through one or more ion depletion compartments, and water that might normally be dedicated to the cathode compartment alone can function as both product water and as electrolyte for the cathode compartment. Water may first be fed to one or more, or all of the ion-depleting compartments and then to the cathode compartment, prior to its use as product water. Alternatively, the feedwater may first be passed through the cathode compartment, then through one or more ion-depletion compartments and then to a point of use. In this manner, all, or a portion, of the water that passes through the cathode compartment can be used as product water, resulting in water savings. Such an arrangement, wherein the cathode compartment may be fluidly connected to one or more ion-depleting compartments, also can provide for effective grounding of the water system through the cathode, thus resulting in higher levels of safety and serviceability, that may be preferred in particular installations such as, for example, domestic water systems.

Water may be supplied to the cathode compartment at a rate that results in an increase in pH of less than about 2 pH units from the time of entry to the time of exit from the cathode compartment. In other embodiments, the pH increase may be limited to about 1, 0.5, 0.2, 0.1 or lesser pH units. Any technique for reducing the pH increase may be employed. One way of controlling the pH increase in the catholyte is by increasing the fluid flow through the cathode compartment. In comparing the flow of water through a cathode compartment to the flow through one of the depletion compartments in the module, a flow ratio of about 1:2, 1:5, 1:10, 1:50 or greater may provide water exhibiting a preferable LSI. For example, if the flow through one ion-depleting compartment is about 40 liters per hour, the flow through the cathode compartment may be about 400 liters per hour, providing a ratio of about 1:10 between the flow through an ion-depleting compartment and the flow through the cathode compartment. If the water passing through all of the ion-depleting compartments in a module is directed through the cathode compartment as well, the ratio of flow between the cathode compartment and an individual ion depleting compartment (assuming equal flow through each compartment) will be equal to the number of ion-depleting compartments in the module. For instance, in a module that contains 25 ion-depleting compartments, if all of the water passing through the ion-depletion compartments also passes through the cathode compartment, the ratio of the flow of water passing through any one of the ion-depleting compartments in relation to the cathode compartment would be about 1:25, if the flow through each of the ion-depleting compartments is the same.

Using product water as catholyte may appear to be counterintuitive for several reasons, including, for example, the higher resistivity of product water in a cathode compartment that typically performs better with low resistivity water. However, product water may be of low enough resistivity, e.g., less than about 1 megaOhm, such that the conductivity through the cathode compartment is not altered to an extent where module performance is significantly degraded. Furthermore, the addition of dissolved hydrogen gas into the product water as it passes through the cathode compartment may provide for a water of lower corrosivity without a concurrent increase in LSI. This water may also provide health benefits as a result of, for example, anti-oxidant activity. Water produced using this may also be less corrosive to copper or copper-containing components than either raw tap water or a water softened by conventional means.

The rate of flow through the cathode compartment may be set or adjusted to be adequate to minimize scale formation. Preferably, the rate of flow through the cathode compartment is greater than about 5 liters per minute of water per amp of current passing through the module. More preferably, the rate of flow through the cathode compartment is greater than or equal to about 12 liters per minute of water per amp applied through the module. As the rise in pH that typically occurs in the cathode compartment may be a function of, among other factors, the current passing through the compartment, the pH increase can also be mitigated by increasing the rate of flow through the compartment in response to an increase in current.

Conventional CEDI modules often suffer from scaling in the ion-concentrating compartments. This may be due to an increase in LSI that may be the result of an increase in calcium concentration in water therein.

In another embodiment, scaling in the ion-concentrating compartments can be reduced by lowering the LSI of water passing through the concentration compartments. One method of achieving this reduction is by using at least a portion of the stream concentrate as anolyte. In this manner, the increase in LSI resulting from a higher concentration of calcium and other dissolved ionic constituents can be countered by lowering the pH component of the LSI. This can be done by passing concentrate through the anode compartment. For example, water may first pass through one or more of the concentrating compartments in a CEDI module and may then be directed through the anode compartment, as anolyte. The water may then be discharged to waste or may be recycled through the system to build up a greater concentration of dissolved species and thus reduce or conserve the amount of water that must be discharged. Thus, a "loop" including at least one concentrating compartment and at least one anode compartment may be employed. A portion of the water may be constantly or intermittently bled or discharged from such a concentrating compartment/anode compartment loop to prevent the buildup of calcium or other ionic constituents to levels that might result in scaling. Alternatively, instead of passing to waste, this ion-fortified water may be used in applications that do not require treated water, for example, irrigation, and other conventional gray water uses.

The water may pass either through the anode compartment first or through one or more ion-concentrating compartments first. For example, if a minimum pH water is desired, then the fluid residence time in the anode compartment may be increased by, for example, fluidly communicating with few or only one ion-concentrating compartment. Alternatively, if all of the ion-concentrating compartments are in communication with the anode compartment, then each of these fluid streams should contribute fluid, and the flow through the anode compartment will be greater, resulting in a smaller pH decrease.

The water may first be passed through the anode compartment and then through one or more ion-concentrating compartments or, alternatively, the water may first be passed through one or more ion-concentration compartments and then through the anode compartment. To prevent scaling in the ion-concentrating compartments it may be preferred to first feed the fluid stream to the anode compartment and then to the ion-concentration compartment or compartments. In this manner, the pH of the feed may be lowered (as is the LSI) prior to being introduced to the ion-concentrating compartment. When the water passing through the anode compartment and the ion-concentrating compartments is part of a recirculation loop, it may be less important to pass the water through the anode compartment first, because the fluid in the recirculation loop (a portion of which will typically have already passed through the anode compartment) can consistently provide water of decreased pH to one or all of the ion-concentration compartments, regardless of the order in which fresh feed is introduced to the two compartments.

In another embodiment of the present invention, at least one of the ion-depleting compartments of the module is in communication with the cathode compartment and at least one of the ion-concentrating compartments of the module is in fluid communication with the anode compartment. In yet another embodiment of the present invention, the anode/concentrating compartment configuration may be similar or identical to the cathode/depleting compartment configuration, so that when the applied electrical polarity of the module is switched, the two fluid streams may correspondingly swap functions as well, soon after the polarity reversal is completed. This can provide a polarity reversal system that decreases the number of valves required compared to many CEDI polarity reversal systems. Thus, while the need for polarity reversal may be diminished because of the reduction in LSI due to other design changes, if polarity reversal is desired, the function of the loops can be switched to accommodate the polarity change.

By constructing each of the two loops so that it may alternatively act as concentrating/anode loop and depleting/cathode loop, the entire loop, and its associated components, need not be continuously exposed to the higher LSI fluid. That is, each loop may be configured and have components that provide a degree of functional symmetry that allows each loop to perform alternating concentrating and depleting roles.

Figure 3:
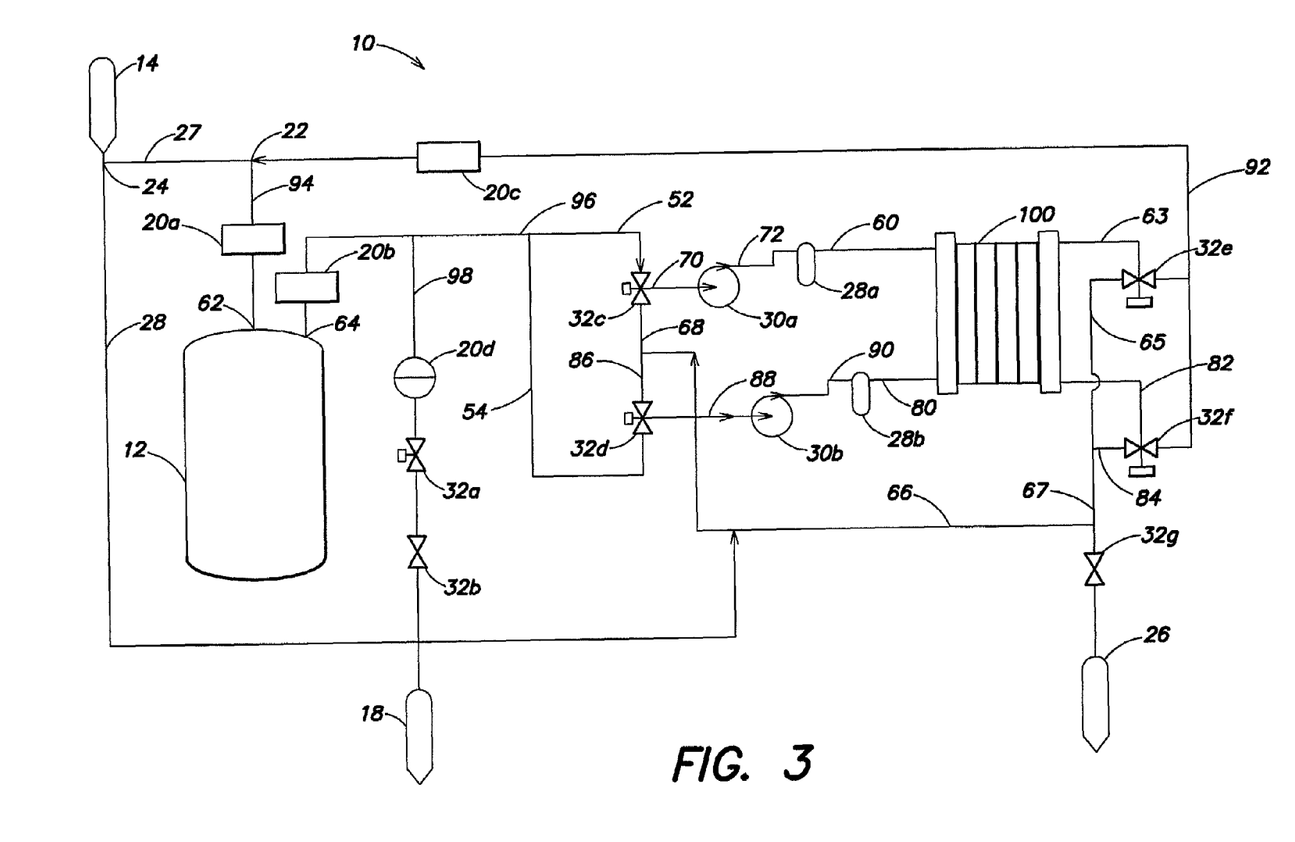
FIG. 3 is a schematic illustration of a system in accordance with one or more embodiments of the present invention.

In accordance with another embodiment of the invention, a water treatment system, preferably a CEDI based system such as that illustrated in FIG. 3, is provided to a point of use so that treated water may be produced for domestic consumption on a continuous basis without regeneration. A supply of treated water may be interrupted when a conventional water treatment device, such as a rechargeable softener, requires regeneration. The present invention, however, may allow for an uninterrupted supply of softened water. Additionally, the system may be installed and serviced by technicians trained in the installation and maintenance of traditional water treatment systems.

Figure 1:
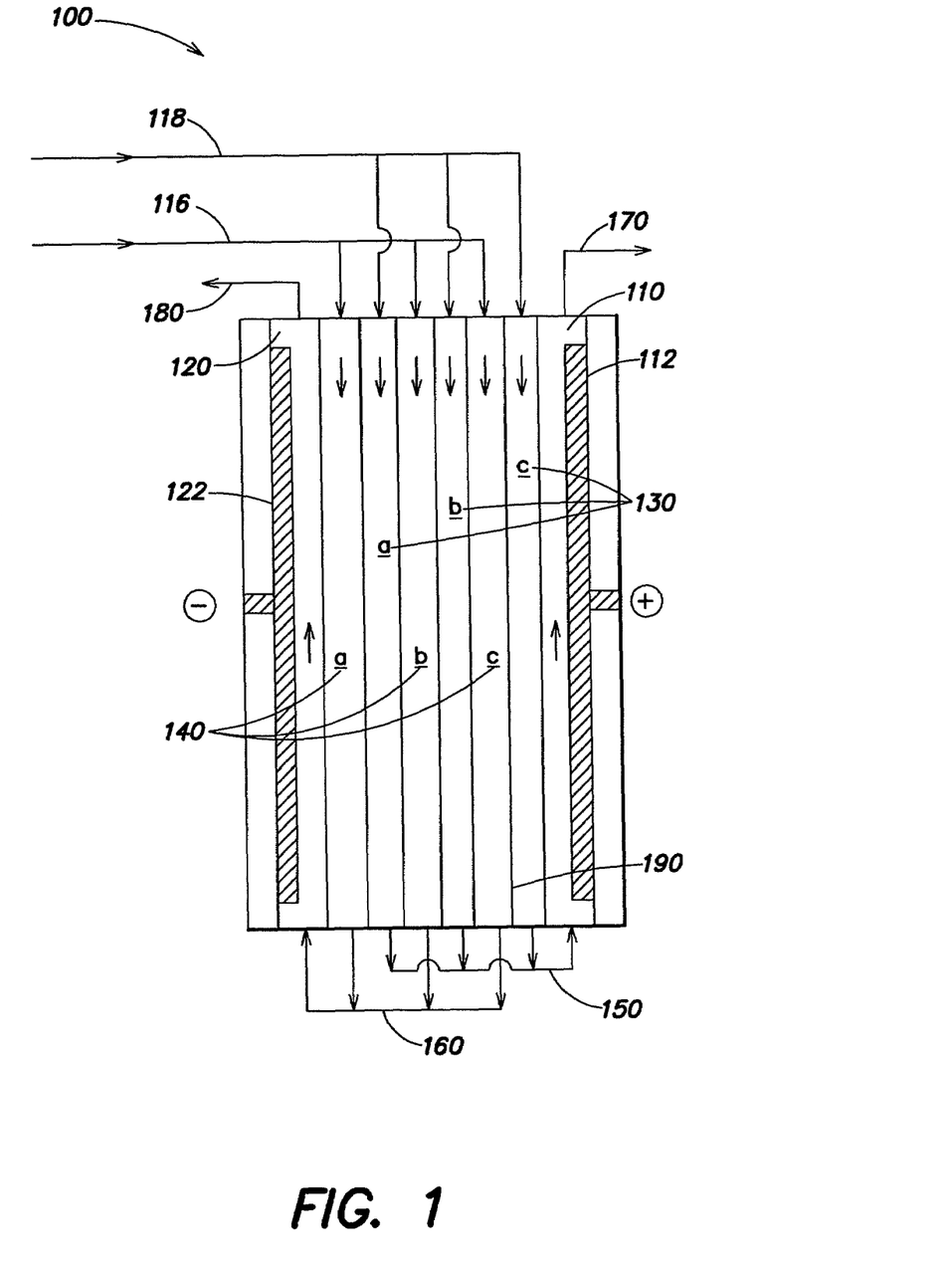
FIG. 1 is a schematic illustration of an electrochemical device or module in accordance with one or more embodiments of the present invention.

FIG. 1 illustrates one embodiment of the invention. Module 100 is shown in cross section illustrating a group of parallel and alternating ion-depleting and ion-concentrating compartments as well as associated cathode and anode compartments at opposing ends of the module. Water from a domestic source, for example, well water or municipal water that may or may not have been treated by passing through a particle and/or carbon filter, is fed to the system by one or more conduits such as conduit 116. From conduit 116, water is fed through ion-depleting compartments 140a, 140b, and 140c. Water is fed from conduit 118 to ion-concentrating compartments 130a, 130b, and 130c. Both the depleting and concentrating compartments are typically filled with an electroactive material or ion exchange material such as ion exchange resin (which may be bound or unbound) or fibers, and each of the compartments is bounded by an anion permeable membrane and a cation permeable membrane, although in other embodiments a compartment may be bounded by two of a similar type membrane. After passing through ion-depleting compartments 140a, 140b, and 140c, a portion, for example, 30%, of the TDS in the water, and in particular, a portion of the hardness ions such as calcium and magnesium typically passes from the ion-depleting compartments through the adjacent ion permeable membranes into an adjoining ion-concentrating compartment. Water then passes through the bottom of each of the ion-depleting compartments into conduit 160 which in turn feeds cathode compartment 120 containing cathode 122. Cathode compartment 120 may or may not contain ion exchange material, and as the water passes through the compartment while current passes through the module, the pH of the water is typically increased and hydrogen gas is typically dissolved into the water in part per million quantities. After exiting the cathode compartment via conduit 180, the water may join a recirculation loop in communication with a storage tank, or may directly feed a point of use.

Water entering the module via conduit 118 passes through concentration compartments 130a, 130b, and 130c that are bounded by an ion semipermeable membrane such as an anion permeable membrane or a cation permeable membrane. The ion-concentrating compartments may be filled with electroactive media or ion exchange material such as ion exchange resins or fibers. After passing through the ion-concentrating compartments, the water is fortified with ionic materials that have been received from adjoining ion-depleting compartments. This water, now containing a greater level of TDS than when it entered the compartments, exits the compartments via conduit 150 and enters anode compartment 110, containing anode 112, and which may or may not be filled with ion exchange material. As the water passes through anode compartment 110, the pH of the water may be lowered, thus reducing the LSI of the concentrated fluid. The water then exits via conduit 170 where all, or a portion, of the water may be bled to waste or intermittently discharged to waste. The water may also enter a loop which is recycled to feed concentrating compartments 130a, 130b, and 130c continuously. In this manner, water may be conserved while bleeding off enough high concentrate so that calcium, magnesium, and other ionic species do not build up to such a level as to reduce efficiency, such as by scaling or clogging sections of the module or its associated components of piping, filters, and valves. In this manner, calcium and other hardness contributing species can be removed from the water while minimizing the amount of concentrate that must be removed from the system. For example, less than about 15, 10 or even 5% of the volume of water treated may be discharged to waste. Furthermore, the concentrate that is removed from the system can be useful in non-softened applications, such as for irrigation or other uses that may not be adversely affected by hardness levels. The addition of high levels of calcium to raise or buffer pH may benefit some applications, that are pH sensitive, such as lawn maintenance.

Figure 2:
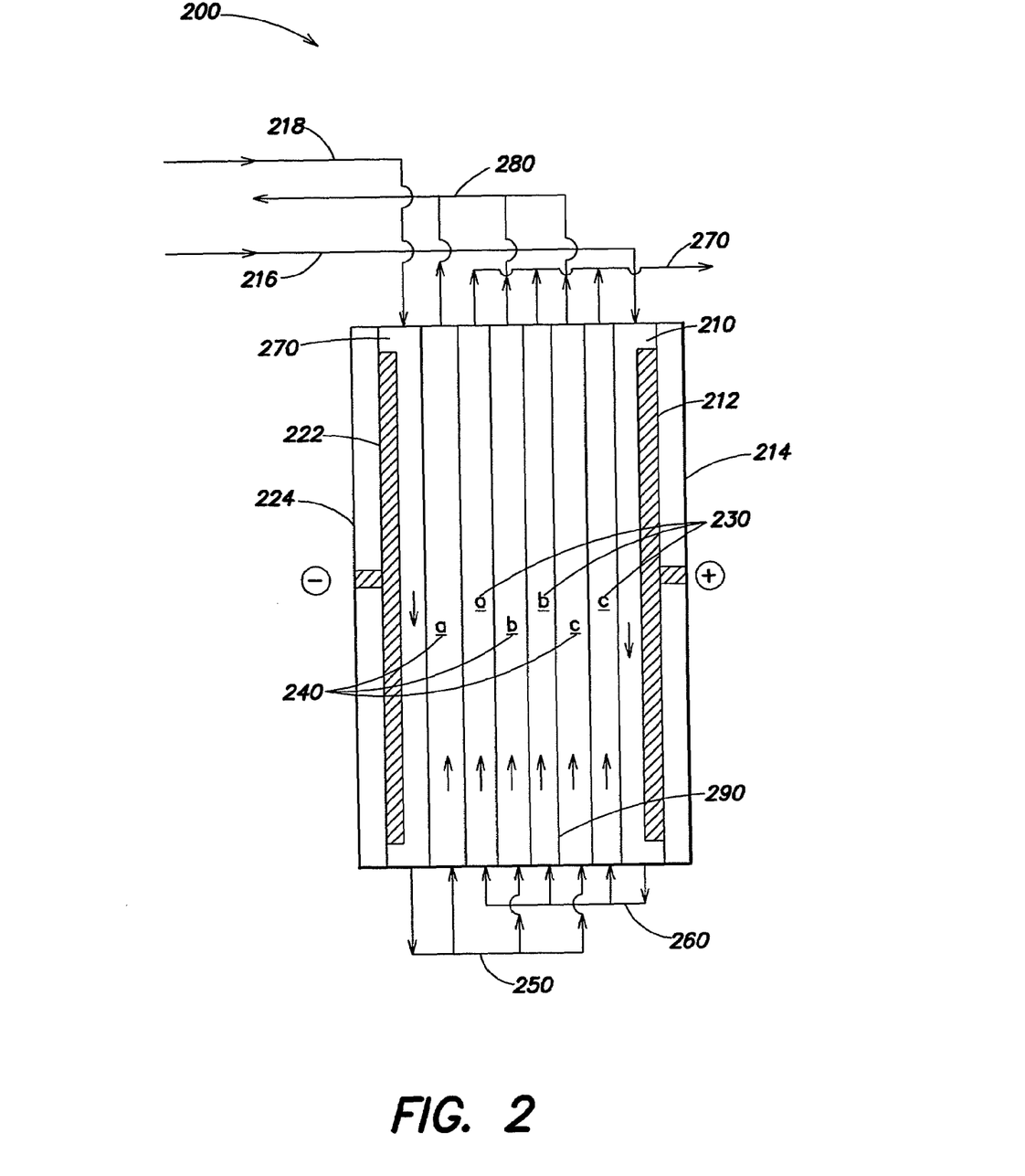
FIG. 2 is a schematic diagram of an electrodeionization module in accordance with one or more embodiments of the present invention.

An alternative embodiment is illustrated in FIG. 2 depicting module 200 in cross section. Water enters the module from a raw, treated or filtered water supply that may be part of a storage loop, including a storage tank, through either conduit 218 that feeds the cathode compartment or conduit 216 that feeds anode compartment 210. Cathode compartment 220 includes cathode plate 222 while anode compartment 210 includes anode plate 212. The spacers and electrodes in the system may be held together by connectors that pass through end blocks 214 and 224. Water passing through anode compartment 210 exits the compartment via conduit 260 at a pH that is lower than when it enters the compartment. The pH of this water may be controlled by several factors including the flow rate of the water through the compartment as well as by the magnitude of the electric current passing through the module. For example, the greater the current and the lower the flow rate, the greater may be the decrease in pH. From conduit 260, the water passes through concentration compartments 230a, 230b, and 230c. These compartments may contain ion exchange material such as ion exchange resin or fibers and may be bounded by semipermeable membranes 290 that may be permeable to anions, cations, or both. As water passes through compartments 230a, 230b, and 230c it typically increases in ionic concentration due to a transfer of ionic materials from the adjoining ion-depleting compartments 240a, 240b, and 240c. After exiting the ion-concentrating compartments, the water is directed to conduit 270 and a portion, or all, of the water may be directed to waste either constantly or intermittently. Conduit 270 may also be part of a recycle loop that serves to feed water back into conduit 216 and anode compartment 210 so that the water may be further concentrated before it is discharged to waste. Any water volume that is lost to waste can be made up by the addition of feed water from inlet 216.

Water that enters through conduit 218 can be directed to cathode compartment 220 that contains cathode 222. Water passes from the top of the cathode compartment to the bottom of the cathode compartment and exits the compartment at a pH that is higher than when it entered. It can also exit with a greater concentration of dissolved hydrogen than when it entered the cathode compartment. After exiting the cathode compartment and entering conduit 250, the water can be directed to ion-depleting compartments 240a, 240b, and 240c. These compartments may contain ion exchange material, for example, ion exchange resins or fibers. The ion exchange material contained in the depletion compartments may be anionic exchange material, cation exchange material, mixed ion exchange material or alternating layers of anion exchange material, cation exchange and/or mixed ion exchange material. Preferably, the ion-depleting compartments contain mixed ion exchange resin as do the adjacent concentrating compartments, allowing the compartments to change function upon reverse polarization. After passing through the ion depleting compartments, the water exits in a more purified state than when it entered, for instance, containing less than about 20, 40, 60, or 80% of the original ion concentration (and particularly, of the hardness ion concentration). Water can then be directed to conduit 280 where it can be sent to a point of use, or into a loop and storage system where it can be mixed with additional source water and recycled through the module one or more times. In this manner, by removing relatively small percentages of the ionic species contained in the water, for example about 10, 20, or 40%, the water may be significantly more purified after several passes through the system at the same removal efficiency. For example, depending on the rate at which the treated water is diluted with source water (which is dependent on the rate of use), a module that reduces the concentration of hardness ion species in the water by about 40% at each pass may result in a purified water that contains only 20% of the hardness of the source water itself. In this way, treated water can be provided by a relatively small module operating at low flow and low current conditions. For example, on a concentration basis, a feed water having a hardness concentration of up to about 1800 ppm, or greater, can be reduced to about 600 ppm, or less, by implementing a recycle loop system.

The module may also be operated in reverse polarity mode. Soon after the polarity of the two electrodes is reversed, the loop, including the anode and concentration compartments, can switch functions with the loop that includes the cathode and dilution compartment. In this manner, compartment 220 becomes the anode compartment and compartment 210 becomes the cathode compartment. Likewise, compartments 240a, 240b, and 240c can become ion-concentrating compartments and 230a, 230b, and 230c can become ion-depleting dilution compartments. By associating an electrode compartment to a series of ion exchange compartments, the number of valves required to be activated upon polarity reversal can be reduced. For example, in the module exemplarily illustrated in FIG. 2, the functions of conduit 270 and conduit 280 can change by simply switching two valves. This is in contrast to systems that may contain a greater number of independently valved components. For example, if the anode compartment, cathode compartment, ion-depleting compartments and ion-concentrating compartments are plumbed separately, then additional valves may be required to correspondingly change the function of each of these compartments upon reversing the polarity of the electrodes. This additional valving can lead to increased cost and maintenance requirements.

FIG. 3 illustrates a system of the invention that may use as a component in an electrodeionization device similar to one depicted in FIG. 1 or 2.

In operation, water may enter the system at point of entry 14 from, for example, a well, or a municipal water source. The water being supplied from point of entry 14 may be split into two or more streams and one stream may feed storage vessel 12 after passing through conduit 94 and flow rate indicated 20a. Another portion of the water received from point of entry 14 is typically fed to conduit 66 that may form part of a softening water treatment device loop, which can utilize an electrochemical device such as a deionization apparatus, an electrodeionization apparatus, and/or an electrodialysis apparatus. In a first polarity mode, water from conduit 66 typically passes through conduit 68 to valve 32c where it can be directed to conduit 70 and pump 30A which, in turn, directs the water to conduit 72 and pretreatment unit 28a that may be, for example, a particulate filter or a carbon filter. After leaving pretreatment unit 28a, the water can pass through conduit 60 and feed into a loop that comprises both the anode compartment and the ion-concentrating compartments of, for example, electrodeionization device 100. After passing through both the anode compartment and the ion-concentrating compartments, the water typically exits through conduit 62 and can be fed to valve 32e where it can be directed to conduit 64. Conduit 64 leads to valve 32g which can permit a discharge of concentrate to waste at drain 26. Water may be passed from drain 26 either intermittently or on a continuous basis and this water may be put to further use, for example, as gray water for irrigation. A portion of the water passing through conduit 64 may also be directed to conduit 66 completing the loop with any water volume that is lost via drain 26 being made up from additional water supplied by point of entry 14.

Concurrently, water typically passes from storage vessel 12 through outlet 64 past pressure indicator 20b and into conduit 96 as well as conduit 98. Water passing through conduit 98 typically passes by pressure indicator 20d, through solenoid valve 32a, manual valve 32b and to a point of use. Water may be supplied to the point of use upon demand. Water passing through conduit 96 can proceed to conduit 54 and, at valve 32d, can be directed to conduit 88, pump 30b, conduit 90, and pretreatment unit 28b which may be, for example, a carbon or particulate filter. After passing through pretreatment unit 28b, water typically passes through conduit 80 and enters a loop in device 100 that may include both ion-depleting compartments and one or more cathode compartments. The water may pass through these two compartment types in any order and can then be received at conduit 82 which is directed by valve 32f to conduit 92 that feeds condition sensor 20c, for example, a conductivity detector, and then conduit 94 that leads to storage vessel 12, thus defining and completing a softening loop. Any water withdrawn from point of use 18 can be made up by feed water from point of entry 14 that joins the loop at tee 22.

Upon polarity reversal, the function of the ion-depleting and ion-concentrating loops can be reversed. In this case, water from conduit 66 can be directed through conduit 86, valve 32d, and into conduit 88 that feeds pump 30b, conduit 90, pretreatment unit 28b, and conduit 80. However, in this mode, conduit 80 feeds a loop that may include both ion-concentrating compartments and the anode compartment, thus exiting through conduit 82 enriched in ionic content. Water can then be directed through valve 32f to conduit 84 and conduit 64 and a portion of the water may be discharged to drain 26 via valve 32g. The remainder of the water may pass through conduit 66 and is redirected through the same loop. Any water lost to drain 26 can be recovered through the addition of make-up water from point of entry 14.

In this reverse polarity mode, water from storage vessel 12 may pass through outlet 64, condition sensor 20b, conduit 96, and conduit 52 and is directed to conduit 70 via valve 32c.

After passing through pump 30a, conduit 72, pretreatment unit 28a, and conduit 60, the water typically enters device stack 100 and passes through a loop that includes, for example, ion-depleting compartments and one or more cathode compartments. After being depleted of ionic content, and in particular, of hardness causing ionic species, water can pass in conduit 62 and directed by valve 32e to conduit 92, condition sensor 20c, to tee 22 and then through conduit 94 to storage vessel 12. Any product water that may be lost to point of use 18 can be made up through the addition of point of feed water through point of use 14 and tee 22.

Polarity reversal may be triggered by any number of factors such as a decrease in water quality or an increase in the potential for scaling. The time in each reversal mode may be determined by, for example, a simple timer, water usage, water conditions, or any combination of these and other factors that may affect the operation of the system. In addition, the polarity may be manually reversed at any time by an operator such as a homeowner or a service technician.

The function and advantage of these and other embodiments of the present invention will be more fully understood from the examples below. The following examples are intended to illustrate the benefits of the present invention, but do not exemplify the full scope of the invention.

Example 1

Figure 4:
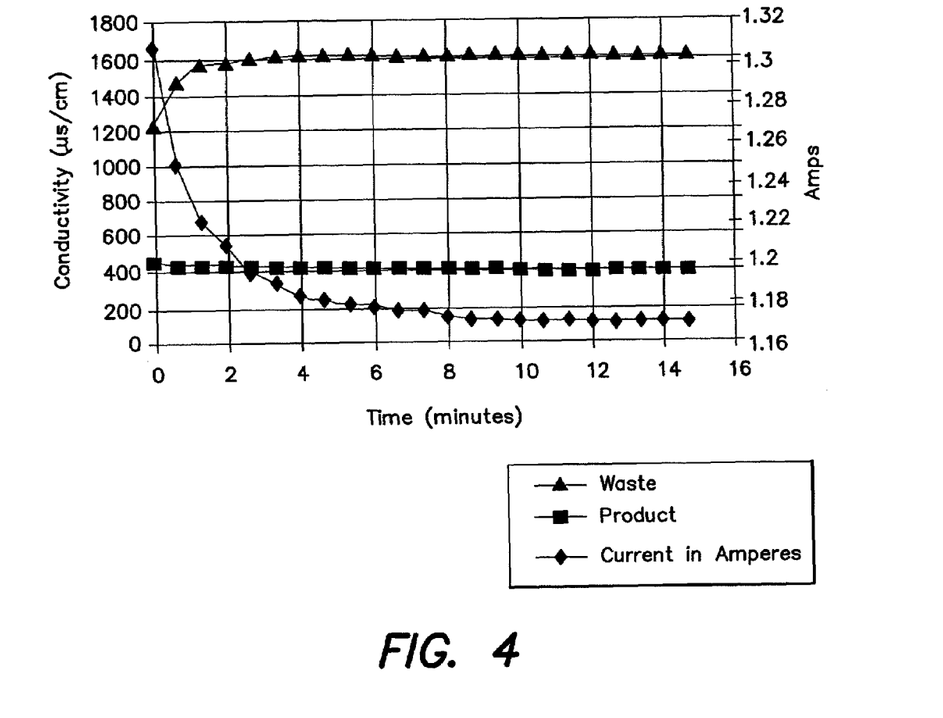
FIG. 4 is a graph illustrating water quality results over time from a system using an electrochemical device in accordance with one or more embodiments of the present invention.

In one experiment, the effectiveness of partially diverting the dilute stream to the cathode as electrode feed was evaluated. A 25 cell pair stack electrodeionization device was fed with a water having about 18 gpg (grains per gallon) hardness and a conductivity of about 730 μS/cm. The feed pressure was about 20 psi and the voltage was applied at about 30 volts. The total dilute flow through the ion-depleting compartments was about 1500 ml/min and a portion of this flow was provided to the cathode compartment to provide an electrode flow of about 250 ml/min. Reject flow from the ion-concentrating compartments was about 480 ml/min. The stack was operated independently of a tank system. Results from this experiment are shown in Table 1, below and in FIG. 4.

TABLE 1

|  | Hardness (gpg) | Alkalinity (ppm) | pH | TDS (ppm) | LSI |
|---|---|---|---|---|---|
| Dilute | 10.2 | 174 | 7.36 | 295 | −0.18 |
| Reject | 45 | 600 | 8.06 | 1132 | 1.62 |
| Electrode | 12.2 | 214 | 9.4 | 322 | 2.03 |

The hardness rejection was about 45% and the TDS rejection was about 41%. After about a day of operation, scale buildup became apparent in the cathode compartment and operation was ceased.

Example 2

In another experiment, the system shown in FIG. 3 was operated with the stack of Example 1. However, a change to the flow path through the stack was made. In this case, instead of shunting a portion of the product water to the electrode chamber, raw water was used as cathode feed fluid. A capillary was used to control the reject discharge at about 250 ml/min and a 30 second flush of the reject stream was run between cycles. About ten gallons of water was discharged from the tank every three hours resulting in about an 80 gallon draw per day. The conductivity of the tank was reduced within about 1½ hours of startup but the electrode capillary was plugged due to scale formation. Data for various fluid streams are provided in Table 2, below.

TABLE 2

|  | Dilute | Reject | Feed to dilute | Conc. Flush | Catholyte |
|---|---|---|---|---|---|
| Hardness (gpg) | 4.5 | 24 | 5.1 | 16.0 | 17.5 |
| Alkalinity (ppm) | 70 | 330 | 80 | 250 | 250 |
| pH | 6.97 | 7.31 | 6.15 | 7.7 | 7.7 |
| TDS (ppm) | 136 | 649 | 150 | 459 | 489 |
| LSI | −1.3 | 0.38 | −2.0 | 0.5 | 0.52 |
| Conductivity (μS/cm) | 200 | 946 | 222 | 663 | 715 |

This example showed that the tank system is capable of providing water at reduced hardness and reduced TDS compared to a non-tank system, but with a requirement that scale buildup be removed.

Example 3

Figure 5:
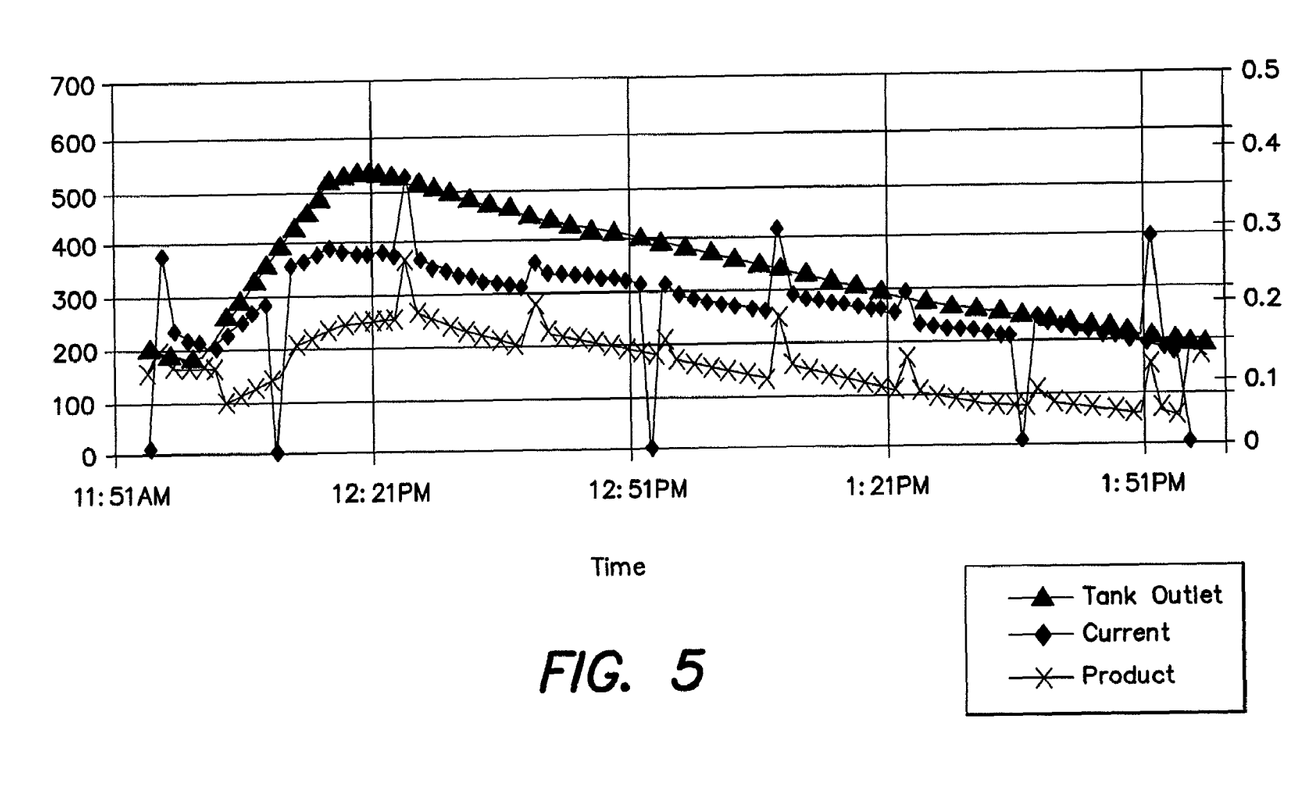
FIG. 5 is a graph illustrating water quality results over time from another system using an electrochemical device in accordance with one or more embodiments of the present invention.

In another experiment, the same system used in Example 2 above was employed with additional changes to the stack. In this case, the ion-depleting compartment chamber was plumbed directly to the cathode compartment so that all of the product water flowed through the cathode compartment. In this manner, the flow rate through the cathode was increased to about 1500 ml/min. About 52 volts were applied to the 25 cell pair stack. As shown in FIG. 5, within about two hours after about a 12 gallon discharge from the tank, the purity of the tank outlet had achieved the cutoff value of about 220 μS/cm. The left axis provides conductivity in μS/cm and the right axis provides current in amps. The percent rejection at the time the system was shut down (upon meeting the cutoff value) was about 64%. Also of note is that there was no evidence of scaling in the cathode compartment.

This demonstrates that when a large portion of the product water, for example, 100% of the product water, is passed through the cathode compartment, the deposition of scale may be reduced or eliminated. Furthermore, additional benefits such as lower TDS are realized when a tank system is employed with a stack utilizing product through cathode. Such a feature may be particularly useful in a water softening system that can benefit from low maintenance requirements.

Example 4

Figure 6:
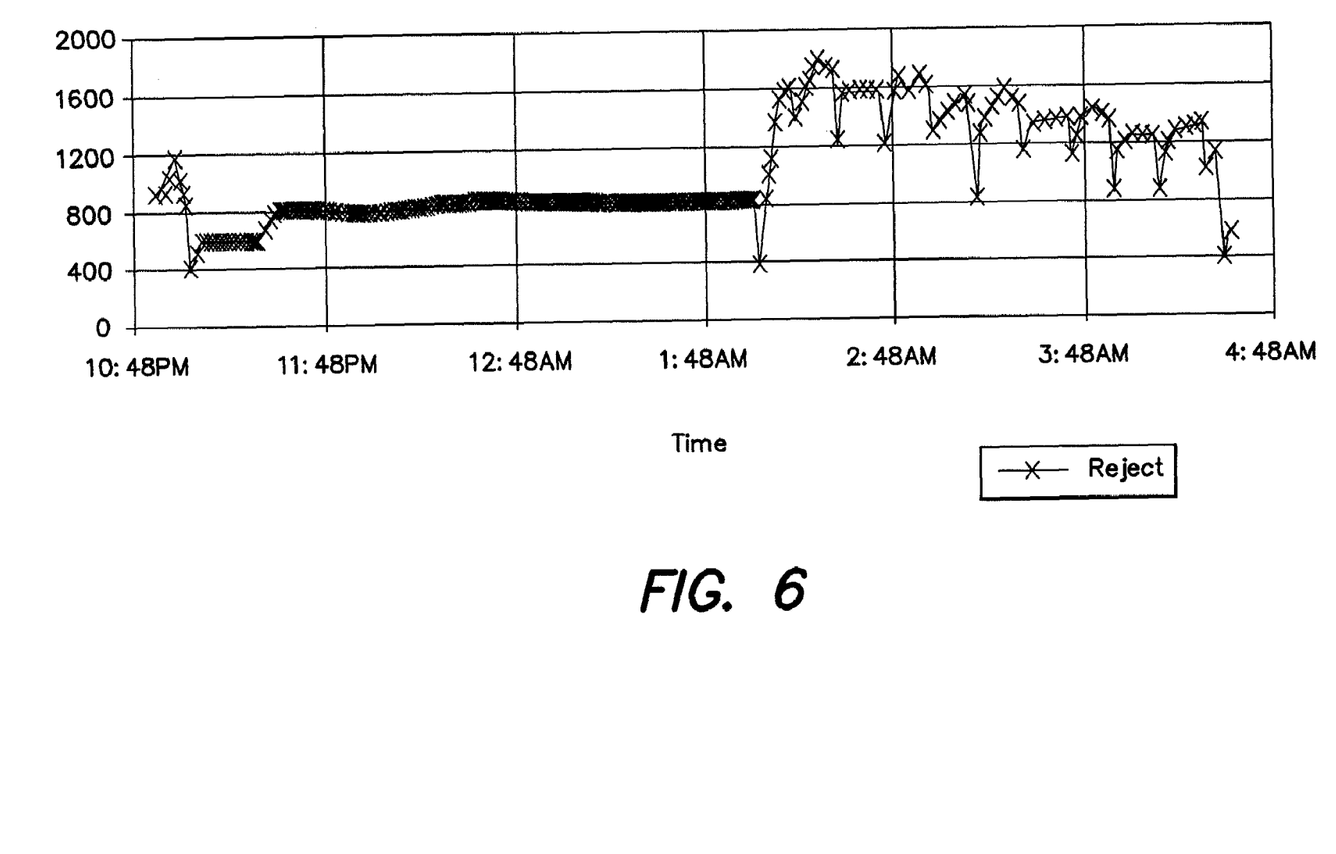
FIG. 6 is a graph illustrating water quality results over time from a system using an electrochemical device in accordance with one or more embodiments of the present invention.

In another experiment, the same system as used in Example 3, above, was used and water quality was monitored through a series of two discharges of about 11 gallons each from the tank. The stack was operated under similar conditions, except that about 40 volts was applied to the stack. As is evident from FIG. 6, the first discharge from the tank was at about 10:48 PM and the resulting in-rush of raw water did not increase conductivity enough to trigger the start of the system. The second discharge from the tank, at about 2:00 AM, resulted in an increase in conductivity that was adequate to start the system, and the conductivity of the water output from the tank recovered to the cutoff value in less than about three hours. Again, as in Example 3 above, no scaling in the cathode compartment was evident. This demonstrates the robustness of the system over more than one cycle of discharge from the tank at volumes that are typical for those used, for example, in a single family residence. There may be several factors that account for the lack of scale deposition in Examples 3 and 4, among which are the lower LSI. That may be due partially to the greater flow rate to the cathode department and also the additional turbulence that has developed in the cathode compartment with the increased flow rates.

In accordance with one or more embodiments of the present invention, one or more components of the treatment system can be cleaned, periodically or as necessary to remove or at least deactivate at least a portion of any contaminating organisms, i.e., bacteria or other microorganisms. For example, wetted surfaces that would be susceptible to accumulation of bacteria can be exposed to one or more cleaning agents such as acids, bases or any other typical cleaning chemicals such as but not limited to alcohols or other disinfectant compounds. In other cases, one or more components of the treatment system can be exposed to water that is at a sufficiently elevated temperature to inactivate bacteria that may accumulate in the treatment system and/or components thereof. In accordance with other embodiments of the present invention, the pretreatment system can comprise any apparatus or device that can render microorganisms such as bacteria inactive in the water to be treated. For example, pretreatment system can comprise one or more apparatus that renders bacteria inactive by exposing them to actinic radiation or ozone. In accordance with or more embodiments with the present invention, treatment system can comprise a post treatment system to remove any undesirable species including, for example, bacteria or other microorganisms before they are introduced or passed through point of use. Examples of suitable post treatment apparatus include, for example, those that expose microorganisms to actinic radiation and/or ozone. Other examples of suitable post treatment systems include filtration such as microfiltration or ultrafiltration devices. Such post treatment systems can be incorporated along any point in the water treatment system but would preferably be utilized at or near a point of use or suitable junctions in a fluid distribution system.

In accordance with one or more embodiments of the present invention, the treatment device can utilize performance enhancing techniques to further remove any accumulated or precipitated hardness species. For example, the electrodeionization device can be periodically reversed as discussed herein and have solubilizing species injected therein to dissolve any precipitated species. Examples of such species include salts that can promote dissolution of precipitated compounds.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. For example, those skilled in the art may recognize that the system, and components thereof, according to the present invention may further comprise a network of systems or be a component of a system such as a household or residential management system. It is, therefore, to be understood that the foregoing embodiments are presented by way of example only and that, within the scope of the appended claims and equivalents thereto, the invention may be practiced otherwise than as specifically described. For example, although the term "bottom" has been used herein to refer to an orientation or direction of water flow, the term has been used only for illustrative purposes and its use does not limit the scope of the claims to a particular orientation. The present invention is directed to each individual feature, system, or method described herein. In addition, any combination of two or more such features, systems or methods, if such features, systems or methods are not mutually inconsistent, is included within the scope of the present invention.

What is claimed is:

1. A water purification apparatus comprising:
   a cathode compartment;
   an anode compartment;
   at least one ion-depleting compartment fluidly connected to the cathode compartment, the at least one ion-depleting compartment positioned between the cathode compartment and the anode compartment; and
   at least one ion-concentrating compartment fluidly connected to the anode compartment, the at least one ion-concentrating compartment in ionic communication with the at least one ion-depleting compartment.

2. The water purification apparatus of claim 1 wherein the cathode compartment is in fluid communication with a purified fluid outlet.

3. The water purification apparatus of claim 2 wherein the purified fluid outlet is downstream of the cathode compartment.

4. The water purification apparatus of claim 1 wherein at least a portion of any water in the apparatus is grounded via a cathode.

5. A method of purifying a fluid comprising:
   passing a first fluid through an ion-depleting compartment of an electrochemical device to produce a second fluid;
   passing at least a portion of the second fluid through a cathode compartment of the electrochemical device;
   passing a third fluid through an anode compartment of the electrochemical device to produce an anolyte; and
   passing at least a portion of the anolyte through at least one ion-concentrating compartment of the electrochemical device.

6. The method of claim 5 wherein all of the second fluid is passed through the cathode compartment.

7. The method of claim 5 further comprising dissolving hydrogen in the second fluid.

8. The method of claim 5 further comprising:
   wherein passing the third fluid through the anode compartment comprises reducing a Langelier Saturation Index (LSI) of the third fluid.

9. The method of claim 8 wherein the LSI is reduced to less than about 0.

10. The method of claim 5 further comprising delivering at least a portion of the second fluid to a point of use after it has flowed through the cathode compartment.

11. The method of claim 5 further comprising reducing the corrosiveness of the second fluid.

12. The method of claim 5 wherein greater than about 10% and less than about 90% of the hardness is removed from the second fluid.

13. The method of claim 12 wherein more than about 30% and less than about 70% of the hardness is removed from the second fluid.

14. The method of claim 12 wherein more than about 50% of the hardness is removed from the second fluid.

15. The method of claim 5 wherein the electrochemical device comprises an electrodeionization device.

16. The method of claim 5 wherein the electrochemical device comprises an electrodialysis device.

17. A method of purifying water comprising:
   passing a first portion of a first water stream through a cathode compartment of a water purification apparatus to produce a second water stream;

passing at least a portion of the second water stream through at least one ion-depleting compartment of the water purification apparatus to produce purified water stream;

passing a second portion of the first water stream through at least one ion-concentrating compartment of the water purification apparatus;

passing the second portion of the first water stream through an anode compartment of the water purification apparatus; and reducing the LSI of the second portion of the first water stream.

18. The method of claim 17 further comprising dissolving hydrogen in the second water stream.

19. The method of claim 17 further comprising delivering the purified water stream to a point of use.

20. The method of claim 17 further comprising reducing the corrosiveness of the second water stream.

21. The method of claim 17 wherein greater than 10% and less than 90% of the hardness is removed from the second water stream.

22. The method of claim 21 wherein more than about 30% and less than about 70% of the hardness is removed from the second water stream.

23. The method of claim 21 wherein more than about 50% of the hardness is removed from the second water stream.

24. The method of claim 17 wherein the LSI is reduced to less than about 0.

25. The method of claim 17 wherein the water purification apparatus comprises an electrodeionization apparatus.

26. A method comprising:
passing a first portion of a first fluid through an ion-concentrating compartment of an electrochemical device to produce a second fluid;

passing a second portion of the first fluid through an ion-depleting compartment of the electrochemical device to produce a third fluid;

reducing the pH of the second fluid in an anode compartment of the electrochemical device; and reducing the corrosiveness of the third fluid.

27. The method of claim 26 wherein the corrosiveness of the third fluid is reduced by adding hydrogen gas to the fluid.

28. The method of claim 26 wherein the corrosiveness of the third fluid is reduced in a cathode compartment of the electrochemical device.

29. The method of claim 26 further comprising passing the third fluid to a domestic point of use.

30. The method of claim 26 further comprising recirculating at least a portion of the third fluid through the ion-depleting compartment.

\* \* \* \* \*

UNITED STATES PATENT AND TRADEMARK OFFICE
CERTIFICATE OF CORRECTION

PATENT NO. : 7,582,198 B2  Page 1 of 1
APPLICATION NO. : 10/712674
DATED : September 1, 2009
INVENTOR(S) : Wilkins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1191 days.

Signed and Sealed this

Fourteenth Day of September, 2010

David J. Kappos
*Director of the United States Patent and Trademark Office*